United States Patent [19]

Gedney

[11] Patent Number: 5,386,461
[45] Date of Patent: Jan. 31, 1995

[54] TELEPHONE OPERATED HEATING, VENTILATING AND/OR AIR CONDITIONING

[76] Inventor: Richard R. Gedney, 159 Bradley Corners Rd., Madison, Conn. 06443

[21] Appl. No.: 148,730

[22] Filed: Nov. 8, 1993

[51] Int. Cl.$^6$ ............................................. H04M 11/00
[52] U.S. Cl. ..................................... 379/102; 379/105
[58] Field of Search ..................... 379/102, 104–106, 379/100

[56] References Cited

U.S. PATENT DOCUMENTS

| | | | |
|---|---|---|---|
| 4,021,615 | 5/1977 | James et al. | 379/102 |
| 4,121,053 | 10/1978 | Dick | 379/104 |
| 4,174,064 | 11/1979 | Pratt, Jr. | 379/102 |
| 4,266,097 | 5/1981 | Cannon et al. | 379/102 |
| 4,353,502 | 10/1982 | Myers | 379/104 |
| 4,418,244 | 11/1983 | Edgar | 379/102 |
| 4,885,766 | 12/1989 | Yasuoka et al. | 379/102 |

FOREIGN PATENT DOCUMENTS

| | | | |
|---|---|---|---|
| 57-78248 | 5/1982 | Japan | 379/104 |
| 2169472 | 7/1986 | United Kingdom | 379/105 |
| 8707802 | 12/1987 | WIPO | 379/100 |
| 8911194 | 11/1989 | WIPO | 379/102 |

*Primary Examiner*—Wing F. Chan
*Attorney, Agent, or Firm*—M. P. Williams

[57] ABSTRACT

A unit for providing heating, ventilation, and/or air conditioning (HVAC, 15) is controlled by one or another thermostat (17a, 17b) in response to a switch (21) the setting of which is controlled by dual tone multiple frequency signals sent from a regular telephone (26) over ordinary phone lines (27). The functions of ring detection and answering a call (28) as well as tone detection (30) may be provided by selected modules (34-38) or by an answering machine (83). A switch used to select one of the thermostats may comprise a stepping relay (21a) a bistable toggle relay (21b), or a bistable relay 21c. The phone control switch apparatus may selectively apply power to an outlet (91) for running a self-contained HVAC such as an air conditioner (94) or a heater (95).

20 Claims, 4 Drawing Sheets

TELEPHONE OPERATED HEATING, VENTILATING AND/OR AIR CONDITIONING

TECHNICAL FIELD

This invention relates to controlling the temperature in a space, by adjusting the operation of a heating, ventilating and/or air conditioning system (HVAC) remotely, by ordinary telephone.

BACKGROUND ART

It may be desirable to allow the temperature of a principal residence vary to an extreme limit when the principal residence is unoccupied by virtue of the occupants being on a business or vacation trip, or residing at a recreational residence (such as a ski or shore cottage). With dual residences, the temperature of either of the residences is typically allowed to range to some extreme limit when unoccupied, yet it is desired to be within a comfort limit when occupied.

It is known to allow the temperature of an unoccupied hotel room to deviate significantly from that which is comfortable for occupants. Typical systems utilize telephone lines or auxiliary telephone lines to control units in the individual rooms. These systems utilize auxiliary thermostats (in addition to those used in the HVAC to control comfortable temperatures) for the enablement of the HVAC system. Systems of this type are shown in U.S. Pat. Nos. 4,021,615; 4,107,466; 4,174,064.

In a residence, the situation is somewhat different because the occupied/unoccupied status of the residence is not monitored by personnel within the same building (as is the case in hotels), and therefore the temperature conditions for an unoccupied room cannot be changed to the desired temperature conditions for an occupied room while the intended occupants are not present. Instead, the adjustment of temperature within the space must await the return of the intended occupants. Such systems have the failing that they do not anticipate the re-occupation of a room, but simply begin the process of temperature correction once the room is designated as occupied.

The foregoing systems, therefore, are useless in assisting in the control of temperatures in residences. Some systems are known for monitoring and controlling various devices and/or conditions within a residence. Typically, these are wired systems which are difficult or impossible to put in place except at the time of construction of a residence. Additionally, such systems do not address the needs of a typical homeowner, because these systems are extremely complex, and have only a limited capability for affecting the system remotely (such as by means of telephone). Examples of such systems are U.S. Pat. No. 4,174,517 and U.S. Pat. No. 4,665,544.

DISCLOSURE OF INVENTION

Objects of the invention include provision of means for adjusting the temperature in a residence remotely, by use of ordinary telephone, which is readily made applicable to existing residences and HVAC systems, including HVAC systems of various types, at relatively low cost.

According to the invention, the temperature-affecting capability of an HVAC in a building is controlled from a standard telephone located outside said building remotely from the building by means of signals transmitted over common carrier telephone lines.

In further accord with the invention, communication of the commands which control the capability of the HVAC from the telephone receiving unit to the thermostat unit may be made over a wired connection, or by low power radio frequency or other electromagnetic radiation. According further to the present invention, the regular thermostat of a conventional HVAC system (such as a hot air furnace with an integral air conditioner) is replaced by a pair of switch-selected thermostats, the selection of which is caused remotely in response to tones transmitted by regular telephone to the building. In accordance with the invention further, the command to select a specific thermostat may be communicated as a function of a standard dual tone multiple frequency tone (DTMF, the normal dialing tones for telephones).

In accordance with another aspect of the invention, the tone command may be utilized instead to permit or prohibit operation of an HVAC (such as a room air conditioner or heat pump), the desired occupied temperature setpoint of which has been preset within the unit itself.

The invention is readily implemented in a wide variety of forms, utilizing various elements of readily available apparatus and known techniques which, when supplemented by the teachings hereinafter, are adequate to perform the invention in a variety of embodiments. For instance, one embodiment utilizes readily available components and subsystems to perform functions such as hook switch, ring detection, answering, tone decode, and so forth. Another embodiment simply picks off a remotely generated function command signal from within a standard (or altered) call answering machine to cause the desired effect. One embodiment utilizes pulses to indicate a desired change in the set point, while another embodiment utilizes tones to designate set point without regard to current setting. Embodiments may use stepper relays, toggle relays, bistable relays or solid state switching.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
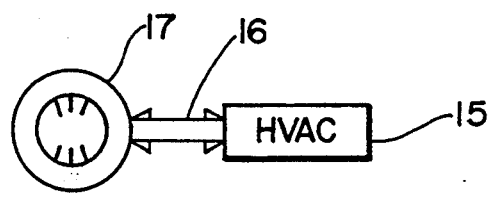
FIG. 1 is a simplified block diagram of a prior art thermostatically controlled HVAC system.

Referring now to FIG. 1, a typical heating, ventilating and/or air conditioning system 15, referred to hereinafter as HVAC, is interconnected by a plurality of wires 16 with a thermostatic switch 17. The HVAC 15 may take a variety of forms, ranging from the simplest of heating units (such as electric baseboard heat) to more complex units (such as hot air furnaces with combined central air conditioning). In the simplest of systems, the thermostatic switch 17 may simply comprise a single, bi-metallic, mercury or other thermal switch that will close when heat is required and open when the heat demand has been satisfied. In more complicated systems, the thermostatic switch 17 may include heating and cooling selection switches, fan operation mode switches, and the like. The connection between the thermostatic switch 17 and the HVAC 15 may comprise between two and six wires 16. As is known, the setpoint (temperature of the thermostatic switch 17 defining the heating or cooling demand) can be adjusted only manually.

Figure 2:
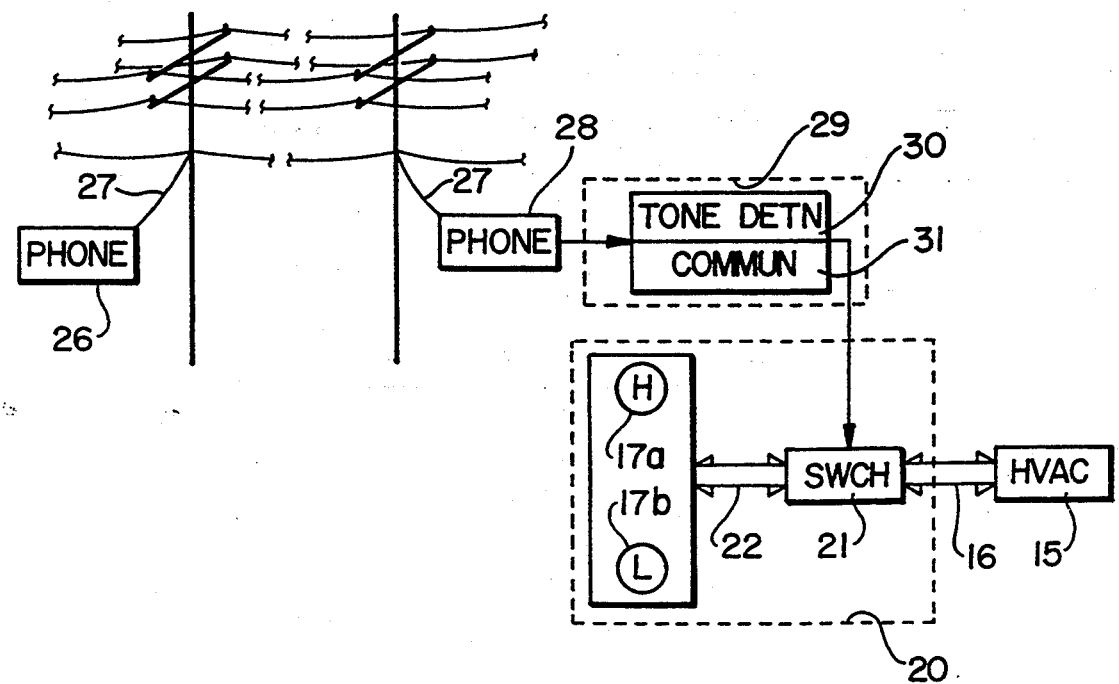
FIG. 2 is a simplified, stylized block diagram of a remotely selected thermostatically controlled HVAC system according to the invention.

Referring to FIG. 2, a thermostatic switch assembly 20, according to one embodiment of the invention, is mounted in place of the thermostatic switch 17 so as to readily utilize the wires 16 for connection to the HVAC 15. The thermostatic switch assembly 20 contains two thermostatic switches 17a, 17b each of which may be as simple or as complex as the single thermostatic switch 17 which the assembly 20 replaces. At any point in time, only one of the thermostatic switches 17a, 17b will be connected over the wires 16 to the HVAC 15 so as to control satisfying the heating or cooling demand. The selection is made by at least one bistable switch 21 which is connected to the thermostatic switches 17a, 17b by suitable wires 22. The bistable switch 21 operates to connect either of the thermostatic switches 17a, 17b to the HVAC 15 so as to cause the heating/cooling demand set point to be the set point preestablished on the selected thermostatic switch.

In accordance with the invention, the switch 21 is selectively operated in response to a command initiated at a remote regular telephone 26 which is connected by ordinary common carrier telephone lines 27 to a telephone 28. In a preferred embodiment, specific tones are used to indicate desired settings of the switch 21; in that embodiment, the telephone 28 interacts with the switch 21 through tone decode and communication means 29 which can take a variety of forms as described hereinafter. This function includes detecting (30) when a switch-actuating tone has been received by the telephone 28 and communicating (31) that fact to the switch 21. If, in a particular installation such as in a residence, the telephone is located remotely from the location of the thermostatic switch 17 (at the end of the wires 16), then some means must be provided to communicate between the phone 28 and the switch 21. The detection of the tone may take place at or near the phone 28, or at or near the switch 21. Thus, the communication (31) may occur between the phone 28 and the tone detection (30) or the communication (31) may occur between the tone detection (30) and the switch 21.

Figure 3:
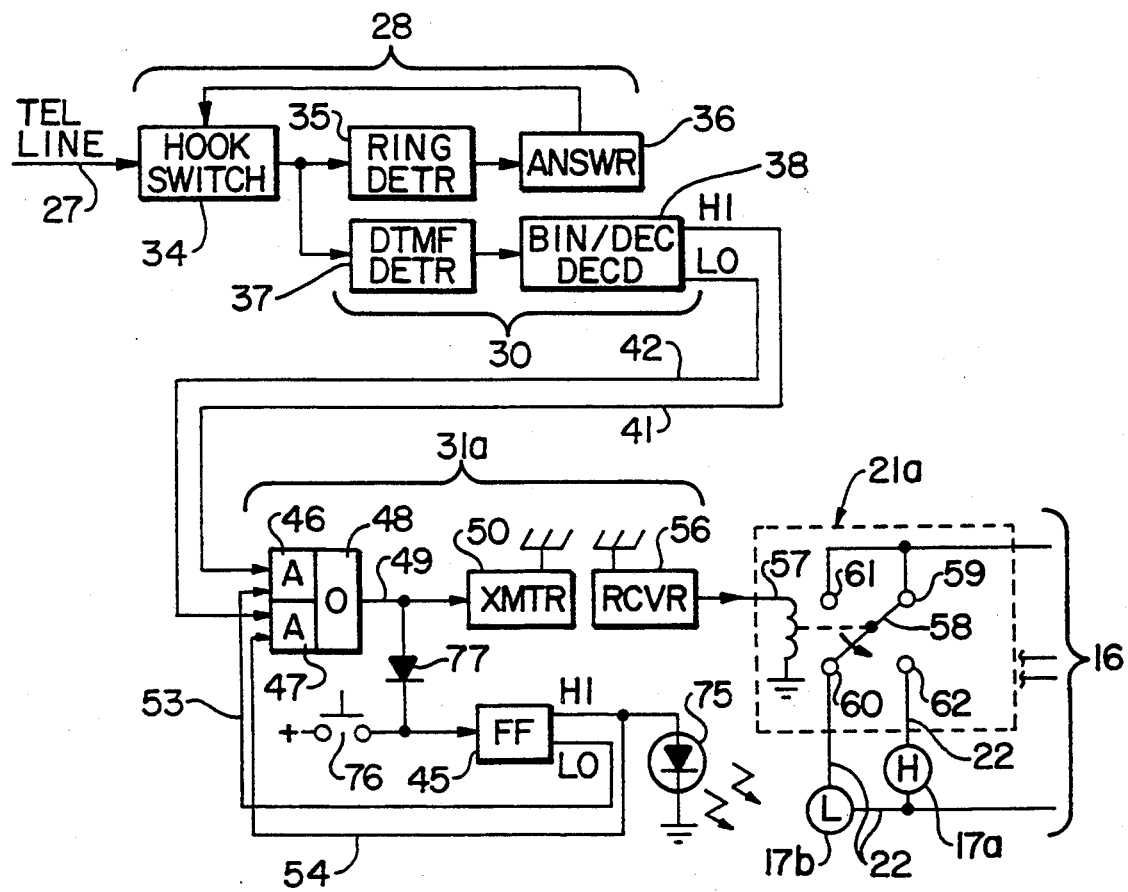
FIG. 3 is a schematic block diagram of a first embodiment of the invention.

The first embodiment of the invention is illustrated in FIG. 3. Therein, the phone apparatus 28 includes a hook switch 34, a ring detector 35, and an answer circuit 36, all of which are conventional and may be the same as or similar to those found in call answering machines. The tone detection 30 is provided by a dual tone multiple frequency (DTMF) detector 37 and a binary to decimal decode circuit 38. The DTMF detector 37 may be a standard DTMF chip found in answering machines. The binary to decimal decode circuit 38 may be a simple diode network, as is known, or may be the decode function in a complex integrated circuit, such as the central processor integrated circuit of a phone answering machine. In FIG. 3, when a detected call is answered, an owner wishing to adjust his HVAC will press a touchtone button on the phone 26 causing the complex frequencies on the telephone line 27 to reach the DTMF detector 37 thereby enabling one of the lines 41, 42 to signal either that a high temperature is desired or that the low temperature is desired. The communication portion 31a of the embodiment of FIG. 3 is a toggle system which has a bistable device such as a flip flop 45 that is in synchronism with the setting of the bistable switch 21a (described below) and the output of which is cross-coupled to a pair of AND gates 46, 47 so that an OR circuit 48 will provide a switching signal on a line 49 to a transmitter 50 only when one of the lines 41, 42 is calling for temperature which is opposite to that being remembered by the flip flop 45. Thus, if the signal appears on the line 41 calling for high temperature, the AND gate 46 will operate only if there is also a signal on a line 53 from the low side of the flip flop 45. If the flip flop 45 indicates that high temperature has already been set in the bistable switch 21a, then the AND gate 46 is blocked so the OR circuit does not produce a signal on the line 49. Similarly, the AND gate 47 will operate only if a signal on a line 54 indicates that the bistable switch 21a is set into the high temperature condition. A signal on the line 49 to the transmitter 50 also operates the flip flop to reverse its state. The transmitter 50 can be a simple transmitter that transmits any kind of signal whatsoever, which need not even be modulated, to a corresponding receiver 56 which is mounted integrally with the switch 21a and the thermostats 17a, 17b directly on the thermostat head, as described with respect to FIG. 2 hereinbefore. The receiver may be very simple and therefore operate on batteries so that there need not be any connection to the thermostat head from either house power or the telephone system, other than the signals transmitted between the transmitter 50 and the receiver 56. The receiver need only slightly amplify and detect the received signal so as to provide a pulse to a coil 57 that will cause a known stepper relay armature 58 to advance from one pair of contacts 59, 60 to another pair of contacts 61, 62. This will cause the selected one of the thermostats 17a, 17b to be connected with the wires 16 and thereby establish control over the HVAC 15 (FIG. 2) whenever a change is indicated by a disparity between the signal on the lines 41, 42 and the signals on the lines 53, 54. The stepper relay may have many pairs of contacts, alternate ones of which connect the selected thermostats.

Figure 4:
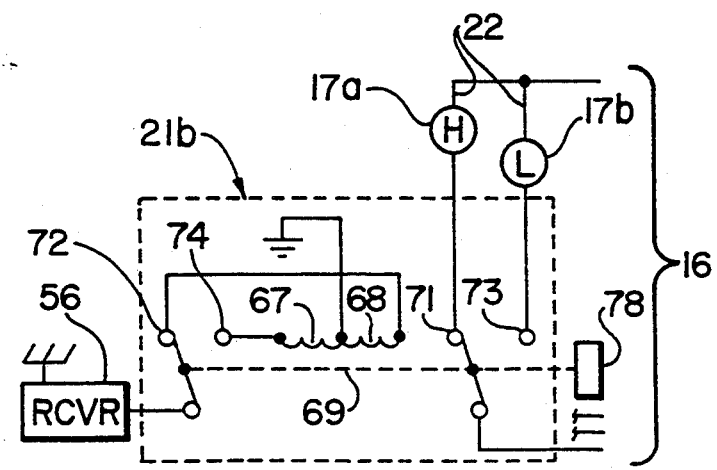
FIG. 4 is a schematic block diagram of an alternative switch for the embodiment of FIG. 3.

An alternative form of switch which may be utilized in the embodiment of FIG. 3 is the bistable switch 21b of FIG. 4. Therein, a double pole, double throw, toggle relay utilizes one set of contacts to apply a pulse from the receiver to a selected one of two coils 67, 68 so as to pull the armature 69 to the left or to the right. As is known, a toggle relay does not move the switch contacts until the armature has moved past a stable point, so that once the moving contacts of the switches begin to move, they will snap entirely away from one fixed contact and toward the other fixed contact. This allows using the relay's own contacts to control which of its coils will be energized in each case. As shown, the armature 69 has been pulled to the left by energizing the coil 67 so that the high temperature thermostat 17a is connected with the wires 16 and so that the next time a pulse is received, it will be transmitted to the coil 68 through the left contact 72 thereby causing the coil 68 to pull the armature 69 to the right and connect the low temperature relay 17b to the right contact 73, instead, and connect the coil 67 to the receiver 56 through the right contact 74.

In the embodiments of FIGS. 3 and 4, it is desirable to provide an LED 75 that will identify when the flip flop 45 is set in one or the other states, such as the high state as shown. Then, the synchronization between the switch 21a, 21b may be checked by adjusting the high thermostat while the fan is in the "auto" position to see if the fan turns on and off in response to temperature adjustments. Synchronization may then be achieved by flipping the flip flop 45 by means of applying a suitable polarity voltage to it through a manual switch 76 while blocking that voltage by means of a diode 77 from operating the transmitter 50. In the embodiment of FIG. 4, synchronization may be had by pressing a manual lever 78, which forces the toggle switch into the high position. The switch 76 and/or lever 78 may also be used to select the desired thermostat locally, by the occupant of the building. Of course, there are numerous other ways in which synchronization may be achieved, maintained, verified and adjusted.

Figure 5:
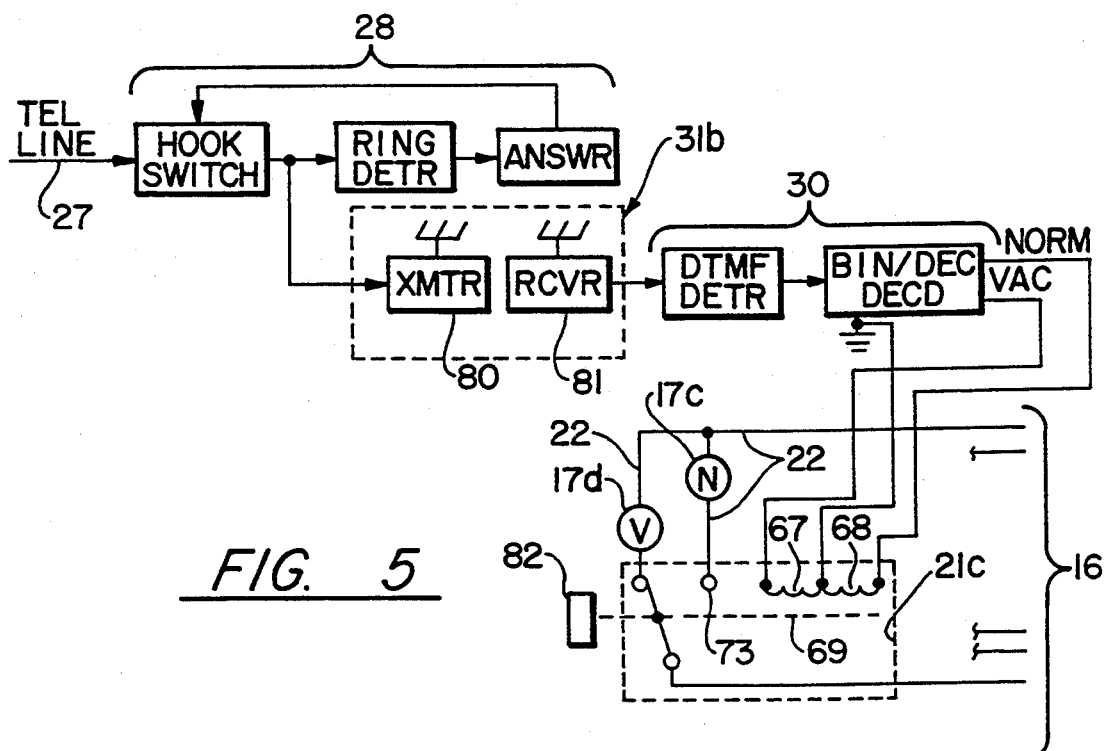
FIG. 5 is a schematic block diagram of a second embodiment of the invention.

In FIG. 5, a second embodiment of the invention illustrates several changes from the embodiments of FIGS. 3 and 4. The first change is that the communication function 31b occurs between the phone function 28 and the tone detection 30. In such a case, a transmitter 80 and corresponding receiver 81 must be selected so as to transmit any and all of the multiple frequencies used for the dual tone. The transmitter and receiver (80, 81) may conveniently be the standard modules utilized in portable telephones, but any simple AM system is usable. Thus, the information in the tone generated by the operator at phone 26 (FIG. 2) is communicated into proximity with the thermostat so that the tone decode function 30 can provide high and low commands directly to a bistable switch 21c, rather than relying on the toggle function of the embodiment of FIGS. 3 and 4. In FIG. 5, only the contacts 71 and 73 of a bistable switch 21c are utilized since toggling need not be controlled by the switch itself. This embodiment avoids the necessity of checking and reestablishing synchronization once in a while, which is offset, however, by the need for additional power to operate the circuitry 30. This will result in higher consumption of batteries, unless the thermostat is near enough to a source of electric power so that the circuits 30 need not be battery operated. A lever 82 may be utilized to manually select the desired thermostat from within the building itself. Since the contacts 72, 74 (FIG. 4) are not used for toggling the bistable switch 21c in FIG. 5, it need not be a toggling switch (that is, one with snap action) but need only be a bistable switch which will remain in whichever position it is placed by energizing one of the coils until the next time the other of the coils is energized. FIG. 5 also indicates that the two thermostats may be used for a normal, occupied temperature (N) and an abnormal, vacant temperature (V). In summer, the vacant thermostat may be set high (e.g., 85°) and the normal temperature set low (e.g., 72°); in winter, the vacant thermostat may be set low (e.g., 60°) and the normal temperature set high (e.g., 70°). Thus, the temperature command can select between high and low temperatures or it can select between normal and vacant temperatures.

Figure 6:
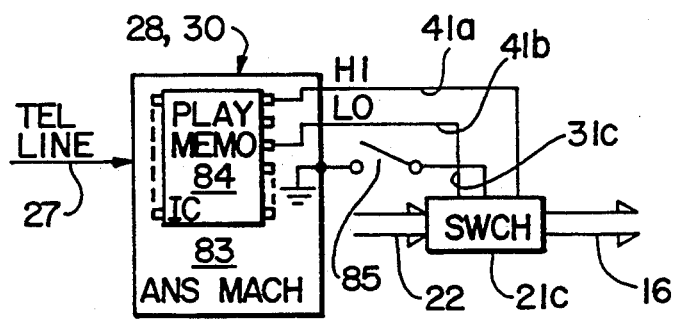
FIG. 6 is a partial simplified block diagram of a variation of the embodiment of FIG. 5 using an answering machine.

FIG. 6 illustrates an embodiment of the invention which is similar to that of FIG. 5 except that it uses a call answering machine 83 to provide the telephone and tone decode functions of the apparatus 34-38 of FIGS. 3 and 4, and it is assumed in FIG. 6 that the telephone call answering machine is mounted in the immediate vicinity of the thermostat so that it can be directly connected by wires 41a, 41b which perform the communication function 31c. The manner of achieving the embodiment of FIG. 6 is to utilize signals on the pins of the central processor integrated circuit 84 or other points in the circuit of a typical call answering machine which cause functions such as playback of the message or of a memo (where memo is playing back a message created internally at the answering machine rather than from incoming phone calls). Simply tapping onto these pins or other circuit points can provide signals which may be designated also as the high and low temperature demand signals on lines 41a, 42b which are identical to the decoded signals on the lines 41 and 42 in the embodiment of FIG. 3. Selecting functions like play and memo always allows the option of pressing the correct tone for either playing incoming messages or playing memos (either alone or after doing the other) so as to select the desired thermostat. In order to prevent normal operation of the answering machine from switching thermostats when that is not desired, a switch 85 can be utilized to break the ground line and thus leave the switch 21c permanently set in one position or the other when the building is occupied and automatic switching is not desired. Of course, the embodiments of FIGS. 3, 4 and 6 may be combined, using the answering machine 83 to provide the inputs on lines 41 and 42 to the toggle system.

Figure 7:
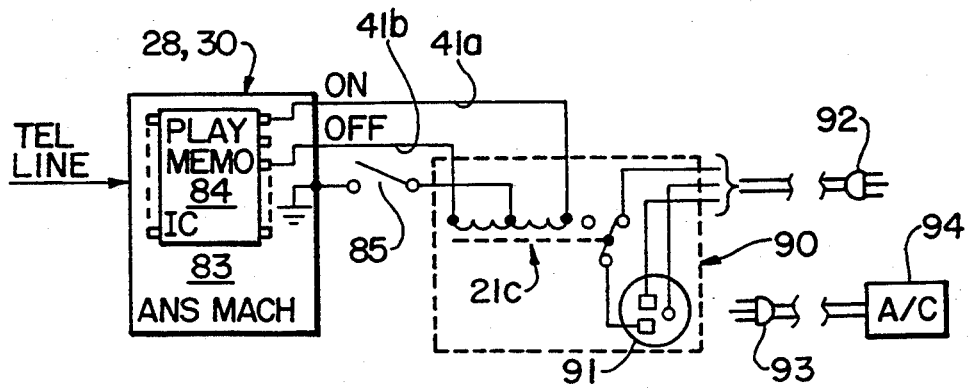
FIG. 7 is a schematic block diagram of a first power-controlling embodiment of the invention.

Referring now to FIG. 7, a different aspect of the invention utilizes the answering machine 83 to control the bistable switch 21c within a power control unit 90 in which the switch 21c selectively connects an outlet 91 with power applied through a line cord from a power-receiving plug 92. By plugging the power cord 93 of an HVAC unit such as an air conditioner 94 into the outlet 91, the HVAC unit can be caused to turn on and off, and when on, will cycle around its previously set, internal thermostatic switch, in the known fashion.

Figure 8:
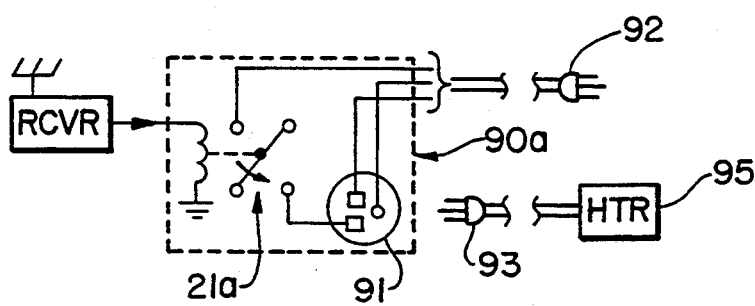
FIG. 8 is a partial schematic block diagram of a second power-controlling embodiment of the invention.

FIG. 8 illustrates a variation of FIG. 7 in which the switch 21a is used, along with the toggle system of FIG. 3, in place of the switch 21c, and in which the HVAC unit is a heater 95 instead of an air conditioning unit 94. If desired, the HVAC unit could be a combination heater/air conditioner, so that turning it on will cause whichever response (heating, cooling) has previously been set in the unit, about the setpoint of the internal thermostatic switch of the unit, as is known. Of course, the switch 21b could be used in FIG. 8.

Another embodiment of the invention provides for additional binary to decimal decoding of the binary signals provided by the DTMF detector in a call answering machine utilizing codes which are not already utilized in the answering machine for the normal telephone functions typically found in answering machines. Typically, there are about eight DTMF combinations unused for remote control in an answering machine, which can be decoded to energize wires equivalent to the wires 41a, 41b of FIGS. 6 and 7 to perform only the remote switching functions described therein.

Figure 9:
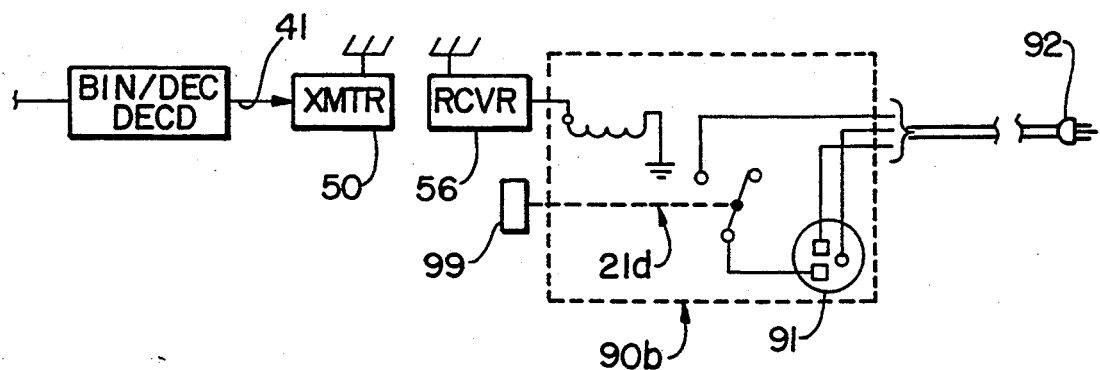
FIG. 9 is a partial schematic block diagram of a third power-controlling embodiment of the invention.

Referring to FIG. 9, a very simple power-controlling embodiment of the invention responds to a single command signal on the line 41 to cause the transmitter 50 to send a signal to the receiver 56 which simply pulls the armature of a single coil bistable relay 21d to the left so as to connect the outlet 91 with the power-receiving plug 92. The relay may be preset in the off state, when leaving the building, by means of a lever 99.

Although not disclosed herein, the control elements for other functions of the HVAC 15 which are contained within the thermostatic switches 17a, 17b may similarly be switched by additional contacts ganged to the contacts disclosed with respect to the setpoint function. On the other hand, if both thermostats have fan control switches, and both fan control switches are set in the same position (either ON or AUTO), then switching of these functions is not required. In any event, such considerations are not relevant to the invention.

The switches used herein need not be magnetically operated, with mechanical contacts (relays) as disclosed, but may be (and in future embodiments preferably will be) solid state switches which in the case of the toggle embodiments of FIGS. 3, 4 and 8 will comprise combinations of flip flops and gates enabled thereby (functionally akin to the apparatus 45–49, 53, 54 in FIG. 3); in the case of the non-toggling embodiments of FIGS. 5–7, the gates would be controlled by a set/reset bistable device rather than controlled with a toggling flip flop 45. The gates may comprise field effect transistors. Since only small signals are involved, this is easily achieved with presently available technology. Thus, the conductive paths for connecting the selected thermostat to the HVAC may either be mechanically actuated switch contacts, or electronic circuit paths.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. Apparatus for selecting the temperature of a space in a building having an HVAC, from a standard telephone located outside of the building remotely from the building by means of dual tone multiple frequency (DTMF) signals transmitted over common carrier telephone lines, consisting essentially of:

telephone connection means, including a ring detector, an answering circuit and a hook switch, for connection directly to common carrier telephone lines and operative in response to a telephone call directed thereto for answering said call;

a tone decoder connected to said telephone connection means, responsive to DTMF signals received thereat for providing a first selected one of a plurality of command signals indicative of a command for a first temperature in response to a first combination of said DTMF signals and for providing a second selected one of said plurality of command signals indicative of a command for a second temperature in response to a second combination of said DTMF signals;

a toggle system including a bistable device operable in either one of two stable states in response to an input signal provided thereto to assume the opposite one of said stable states, said toggle system providing a switching signal in response to said first selected signal concurrently with said bistable device being in a first one of said stable states and in response to said second selected signal concurrently with said bistable device being in a second one of said stable states, said switching signal being provided as an input signal to said bistable device;

a bistable switch having a first conductive path enabled and a second conductive path disabled when said bistable switch is in a first one of two stable switch states and having said first conductive path disabled and said second conductive path enabled when said bistable switch is in a second one of said two stable switch states, said bistable switch switching from either of said two stable switch states to the other of said two stable switch states in response to an input signal provided thereto;

a first thermostatic switch for connection through said first conductive path to the HVAC to cause said HVAC to operate at a first temperature set point, and a second thermostatic switch for connection through said second conductive path to the HVAC to cause said HVAC to operate at a second temperature set point; and means for communicating said switching signal to said bistable switch as an input signal thereto, whereby in response to DTMF signals indicative of a command for said first temperature said bistable switch will remain in or assume said first bistable switch state and in response to DTMF signals indicative of a command for said second temperature said bistable switch will remain in or assume said second bistable switch state, thereby to select the temperature set point for the HVAC.

2. Apparatus according to claim 1 wherein said means for communicating comprises an electromagnetic transmitter responsive to said switching signal to provide a transmitted signal and an electromagnetic receiver responsive to said transmitted signal to replicate said switch signal as said input signal to said bistable switch.

3. Apparatus according to claim 1 wherein said bistable switch is a toggle relay having a first coil to enable said first conductive path and a second coil to enable said second conductive path.

4. Apparatus according to claim 3 wherein said toggle relay is a double pole, double throw relay and said switching signal is either applied to said first coil through said second conductive path of one of said poles or to said second coil through said first conductive path of said one pole, alternatively.

5. Apparatus according to claim 1 wherein said bistable switch is a stepper relay, alternate settings of which establish said first and second conductive paths.

6. Apparatus according to claim 1 wherein said toggle system includes an indicator to provide a visual indication of the stable state assumed by said bistable device.

7. Apparatus according to claim 1 wherein said telephone connection means and said tone decoder are part of a standard telephone call answering machine.

8. Apparatus for selecting the temperature of a space in a building having an HVAC, from a standard telephone located outside of the building remotely from the building by means of dual tone multiple frequency (DTMF) signals transmitted over common carrier telephone lines, consisting essentially of:

telephone connection means, including a ring detector, an answering circuit and a hook switch, for connection directly to common carrier telephone lines and operative in response to a telephone call directed thereto for answering said call;

a tone decoder, responsive to DTMF signals received thereat for providing a first selected one of a plurality of command signals indicative of a command for a first temperature in response to a first combination of said DTMF signals and for providing a second selected one of said plurality of command signals indicative of a command for a second temperature in response to a second combination of said DTMF signals;

means connected to said telephone connection means for communicating DTMF signals received thereat to said tone decoder;

a bistable switch connected to said tone decoder and having a first conductive path enabled and a second conductive path disabled when said bistable switch is in a first one of two stable switch states and having said first conductive path disabled and said second conductive path enabled when said bistable switch is in a second one of said two stable switch states, said bistable switch switching from said first stable switch state to said second stable switch state in response to said first selected signal provided thereto, and switching from said second stable switch state to said first stable switch state in response to said second selected signal provided thereto; and a first thermostatic switch for connection through said first conductive path to the HVAC to cause said HVAC to operate at a first temperature setpoint, and a second thermostatic switch for connection through said second conductive path to the HVAC to cause said HVAC to operate at a second temperature set point, thereby to select the temperature setpoint for the HVAC.

9. Apparatus according to claim 8 wherein said means for communicating comprises a transmitter for transmitting a signal modulated with said DTMF signals and a receiver responsive to said transmitter signal for detecting said modulation and providing DTMF signals to said tone decoder.

10. Apparatus according to claim 8 wherein said means for communicating comprises a wire circuit.

11. Apparatus according to claim 8 wherein said bistable switch is a bistable relay.

12. Apparatus according to claim 8 wherein said telephone connection means is part of a standard telephone call answering machine.

13. Apparatus for selectively applying power to a power outlet in a building from a standard telephone located outside of the building remotely from the building by means of dual tone multiple frequency (DTMF) signals transmitted over common carrier telephone lines, consisting essentially of:

telephone connection means, including a ring detector, an answering circuit and a hook switch, for connection directly to common carrier telephone lines and operative in response to a telephone call directed thereto for answering said call;

a tone decoder connected to said telephone connection means, responsive to DTMF signals received thereat for providing a command signal indicative of a command to energize the outlet in response to a predetermined combination of said DTMF signals;

a bistable switch having a conductive path enabled when said bistable switch is in a first one of two stable switch states and disabled when said bistable switch is in a second one of said two stable switch states, said bistable switch assuming said first stable switch state in response to an input signal provided thereto;

a power receiving plug for connection to a source of electrical power;

a power outlet for connection through said conductive path to said power receiving plug; and means for communicating said command signal to said bistable switch as an input signal thereto, whereby in response to DTMF signals indicative of a command to energize the outlet, said bistable switch will assume said first bistable switch state thereby to connect the power outlet to said power receiving plug.

14. Apparatus according to claim 13 wherein said means for communicating comprises an electromagnetic transmitter responsive to said switching signal to provide a transmitted signal and an electromagnetic receiver responsive to said transmitted signal to replicate said switch signal as said input signal to said bistable switch.

15. Apparatus according to claim 13 wherein said telephone connection means and said tone decoder are part of a standard telephone call answering machine.

16. Apparatus according to claim 13 wherein said means for communicating comprises a wire circuit.

17. Apparatus according to claim 13 wherein said bistable switch is a bistable relay.

18. Apparatus according to claim 13 wherein:
said tone decoder is also responsive to DTMF signals received thereat for providing a second command signal indicative of a command to disenergize the outlet in response to a second combination of said DTMF signals;

said conductive path being disabled when said bistable switch is in a second one of said two stable switch states, said bistable switch assuming said second stable switch state in response to said second command signal.

19. Apparatus according to claim 18 wherein said telephone connection means and said tone decoder are part of a standard telephone call answering machine.

20. Apparatus according to claim 18 wherein said bistable switch is a bistable relay.

* * * * *